US012715477B2

(12) United States Patent
Kim et al.

(10) Patent No.: US 12,715,477 B2
(45) Date of Patent: Aug. 25, 2026

(54) VEHICLE CONTROL METHOD AND VEHICLE CONTROL DEVICE

(71) Applicants: Hyundai Motor Company, Seoul (KR); Kia Corporation, Seoul (KR)

(72) Inventors: Sung Kwan Kim, Hwaseong-Si (KR); Su Young Choi, Hwaseong-Si (KR); Sung Woo Choi, Hwaseong-Si (KR); Su Jin Han, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 133 days.

(21) Appl. No.: 18/918,214

(22) Filed: Oct. 17, 2024

(65) Prior Publication Data

US 2025/0296602 A1 Sep. 25, 2025

(30) Foreign Application Priority Data

Mar. 25, 2024 (KR) ........................ 10-2024-0040474

(51) Int. Cl.
*B60W 60/00* (2020.01)

(52) U.S. Cl.
CPC . *B60W 60/0027* (2020.02); *B60W 2554/4026* (2020.02); *B60W 2554/4029* (2020.02); *B60W 2554/4041* (2020.02); *B60W 2554/4044* (2020.02)

(58) Field of Classification Search
CPC ........................ B60W 60/001; B60W 60/0027
See application file for complete search history.

(56) References Cited

U.S. PATENT DOCUMENTS 9,405,293 B2 * 8/2016 Meuleau .............. G06Q 10/047
2023/0192127 A1 * 6/2023 Funke ................. B60W 30/025 701/25
2023/0219567 A1 * 7/2023 Iwai ................... B60W 60/0011 701/26

FOREIGN PATENT DOCUMENTS

CN 115808929 A * 3/2023

OTHER PUBLICATIONS

Smit et al., "Informed sampling-based trajectory planner for automated driving in dynamic urban environments"; arXiv:2210.02335v1; Oct. 5, 2022.*
English Translation of CN 115808929 A.*

* cited by examiner

*Primary Examiner* — Anshul Sood
(74) *Attorney, Agent, or Firm* — Banner & Witcoff, Ltd.

(57) ABSTRACT

A method performed for autonomous driving of a vehicle is introduced. The method may comprise generating, based on state information of a moving object, a point in a first sampling area as a first preliminary sample point, determining, based on a sample point fixing condition associated with a goal point and information associated with the first preliminary sample point, a first fixed sample point, generating, based on updated state information, a point in a second sampling area as a second preliminary sample point, determining, based on the sample point fixing condition and information associated with the second preliminary sample point, a second fixed sample point, generating, based on a fixed sample point group comprising the first fixed sample point and the second fixed sample point, a travel path, generating, based on the travel path, a control signal, and controlling, based on the control signal, the vehicle for autonomous driving.

20 Claims, 7 Drawing Sheets

VEHICLE CONTROL METHOD AND VEHICLE CONTROL DEVICE

CROSS-REFERENCE TO RELATED APPLICATION

This application claims the benefit of priority to Korean Patent Application No. 10-2024-0040474, filed in the Korean Intellectual Property Office on Mar. 25, 2024, the entire contents of which are incorporated herein by reference.

TECHNICAL FIELD

The present disclosure relates to a vehicle control method and device.

BACKGROUND

The matters described in this Background section are only for enhancement of understanding of the background of the disclosure, and should not be taken as acknowledgement that they correspond to prior art already known to those skilled in the art. Autonomous driving technology are developing rapidly, and the need to efficiently generate a travel path is being emerged.

It is difficult to generate a travel path in the absence of precise map information (e.g., if there is no information about lane links) because travel paths may be generated by taking into account a host vehicle's position and lane links on precise map information.

Accordingly, methods for generating travel paths even in situations where there is no precise map information are being studied.

SUMMARY

According to the present disclosure, a method performed by one or more processors for autonomous driving of a vehicle, the method comprising generating, based on state information of a moving object, a point in a first sampling area as a first preliminary sample point, determining, based on a sample point fixing condition associated with a goal point and information associated with the first preliminary sample point, a first fixed sample point, generating, based on updated state information, a point in a second sampling area as a second preliminary sample point, wherein the updated state information is state information of the moving object updated based on the first fixed sample point, determining, based on the sample point fixing condition and information associated with the second preliminary sample point, a second fixed sample point, generating, based on a fixed sample point group comprising the first fixed sample point and the second fixed sample point, a travel path, generating, based on the travel path, a control signal, and controlling, based on the control signal, the vehicle for autonomous driving.

The method, further comprising after the generating of the travel path, generating at least one additional travel path, based on a plurality of points included in the fixed sample point group and a plurality of points included in an additional fixed sample point group of the at least one additional travel path, determining an optimal travel path, and controlling, based on the optimal travel path, the vehicle for autonomous driving.

The method, wherein the determining the optimal travel path comprises determining the optimal travel path by comparing first information and second information, wherein the first information comprises a first circle generated based on the goal point, an n-th fixed sample point, which is a last determined point among points included in the fixed sample point group, and an (n−1)-th fixed sample point, which is a point determined immediately before the n-th fixed sample point among points included in the fixed sample point group, and wherein the second information comprises a second circle generated based on the goal point, an m-th fixed sample point, which is a last determined point of points included in the additional fixed sample point group, and an (m−1)-th fixed sample point, which is a point determined immediately before the m-th fixed sample point among points included in the additional fixed sample point group.

The method, wherein the state information of the moving object comprises variable state information, wherein the variable state information comprises position information of the moving object and heading information of the moving object, and fixed state information, wherein the fixed state information comprises length information of the moving object and a maximum steering angle of the moving object.

The method, wherein the determining the first fixed sample point comprises determining, based on a first free space area condition calculated using the state information of the moving object, the first fixed sample point, wherein the first fixed sample point satisfies the first free space area condition, and wherein the determining the second fixed sample point comprises determining, based on a second free space area condition calculated using the state information of the moving object, the second fixed sample point, wherein the second fixed sample point satisfies the second free space area condition.

The method, wherein the determining the second fixed sample point comprises generating, based on the second preliminary sample point not satisfying at least one of the sample point fixing condition and the second free space area condition, a second point in the second sampling area as the second preliminary sample point, and determining, based on the sample point fixing condition, the second free space area condition, and the information associated with the second preliminary sample point, the second fixed sample point, wherein the second fixed sample point satisfies the sample point fixing condition and the second free space area condition.

The method, wherein the determining the second fixed sample point comprises determining, based on comparing a first heading difference value and a second heading difference value, the second fixed sample point, wherein the first heading difference value is a difference value between heading information at the first preliminary sample point and heading information at the goal point, the second heading difference value is a difference value between heading information at the second preliminary sample point and heading information at the goal point, and the second preliminary sample point is located within a predetermined area that is set based on the goal point.

The method, wherein the determining the second fixed sample point comprises generating, based on the second heading difference value being outside a threshold range set based on the first heading difference value, a second point in the second sampling area as the second preliminary sample point, and determining, based on the sample point fixing condition and comparing the first heading difference value and the second heading difference value, the second fixed sample point, wherein the second fixed sample point satisfies the sample point fixing condition.

The method, wherein the state information comprises at least one of current location of the moving object or direction and orientation of the moving object.

The method, wherein the information associated with the first preliminary sample point comprises a position of the first preliminary sample point.

According to the present disclosure, a device for autonomous driving of a vehicle, the device comprising one or more processors, and memory storing instructions, when executed by the one or more processors cause the device to generate, based on state information of a moving object, a point in a first sampling area as a first preliminary sample point, generate, based on updated state information, a point in a second sampling area as a second preliminary sample point, wherein the updated state information is state information of the moving object updated based on a first fixed sample point, determine, based on a sample point fixing condition associated with a goal point and information associated with the first preliminary sample point, the first fixed sample point, determine, based on the sample point fixing condition and information associated with the second preliminary sample point, a second fixed sample point, generate, based on a fixed sample point group comprising the first fixed sample point and the second fixed sample point, a travel path, generate, based on the travel path, a control signal, and control, based on the control signal, the vehicle for autonomous driving.

The device, wherein the one or more processors are further configured to generate at least one additional travel path, based on a plurality of points included in the fixed sample point group and a plurality of points included in an additional fixed sample point group of the at least one additional travel path, determine an optimal travel path, and control, based on the optimal travel path, the vehicle for autonomous driving.

The device, wherein the one or more processors are further configured to determine the optimal travel path by comparing first information and second information, wherein the first information comprises a first circle generated based on the goal point, an n-th fixed sample point, which is a last determined point among points included in the fixed sample point group, and an (n−1)-th fixed sample point, which is a point determined immediately before the n-th fixed sample point among points included in the fixed sample point group, and wherein the second information comprises a second circle generated based on the goal point, an m-th fixed sample point, which is a last determined point of points included in the additional fixed sample point group, and an (m−1)-th fixed sample point, which is a point determined immediately before the m-th fixed sample point among points included in the additional fixed sample point group.

The device, wherein the state information of the moving object comprises variable state information, wherein the variable state information comprises position information of the moving object and heading information of the moving object, and fixed state information, wherein the fixed state information comprises length information of the moving object and a maximum steering angle of the moving object.

The device, wherein the one or more processors are further configured to determine, based on a first free space area condition calculated using the state information of the moving object, the first fixed sample point, wherein the first fixed sample point satisfies the first free space area condition, and determine, based on a second free space area condition calculated using the state information of the moving object, the second fixed sample point, wherein the second fixed sample point satisfies the second free space area condition.

The device, wherein the one or more processors are further configured to generate, based on the second preliminary sample point not satisfying at least one of the sample point fixing condition and the second free space area condition, a second point in the second sampling area as the second preliminary sample point, and determine, based on the sample point fixing condition, the second free space area condition, and the information associated with the second preliminary sample point, the second fixed sample point, wherein the second fixed sample point satisfies the sample point fixing condition and the second free space area condition.

The device, wherein the one or more processors are further configured to determine, based on comparing a first heading difference value and a second heading difference value, the second fixed sample point, wherein the first heading difference value is a difference value between heading information at the first preliminary sample point and heading information at the goal point, the second heading difference value is a difference value between heading information at the second preliminary sample point and heading information at the goal point, and the second preliminary sample point is located within a predetermined area that is set based on the goal point.

The device, wherein the one or more processors are further configured to generate, based on the second heading difference value being outside a threshold range set based on the first heading difference value, a second point in the second sampling area as the second preliminary sample point, and determine, based on the sample point fixing condition and comparing the first heading difference value and the second heading difference value, the second fixed sample point, wherein the second fixed sample point satisfies the sample point fixing condition.

The device, wherein the state information comprises at least one of current location of the moving object, or direction and orientation of the moving object.

The device, wherein the information associated with the first preliminary sample point comprises a position of the first preliminary sample point.

BRIEF DESCRIPTION OF THE DRAWINGS

The above and other objects, features and advantages of the present disclosure will be more apparent from the following detailed description taken in conjunction with the accompanying drawings.

In the description of the drawings, the same or similar reference numerals may be used for the same or similar components.

DETAILED DESCRIPTION

Figure 1:
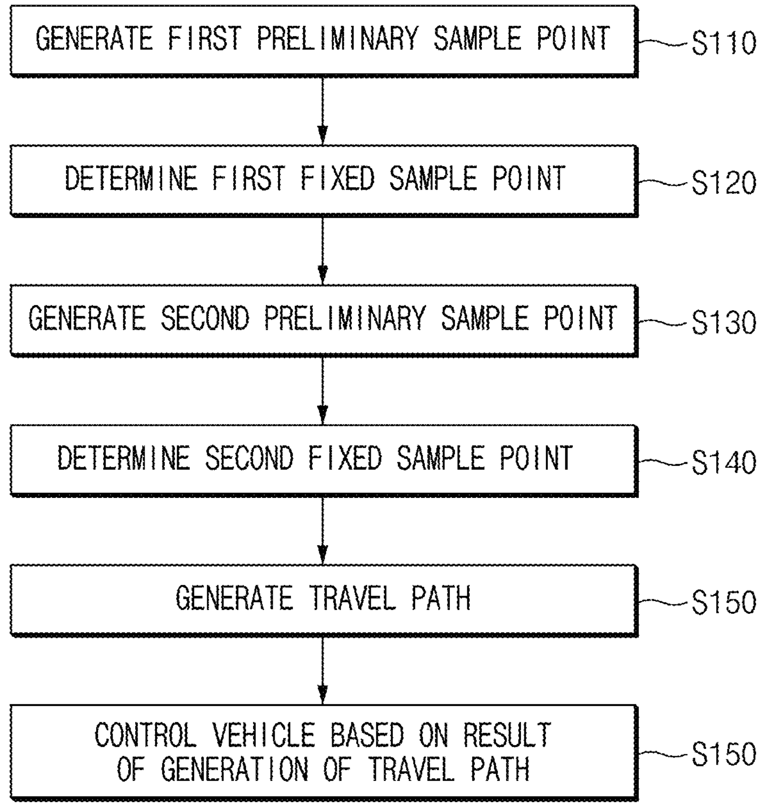
FIG. 1 shows an example of a vehicle control method according to an example disclosed herein.

Hereinafter, with reference to the accompanying drawings, examples of the present disclosure will be described in detail such that those of ordinary skill in the art may easily carry out the present disclosure. However, the present disclosure may be embodied in many different forms and should not be construed as limited to the examples set forth herein.

Further, in describing the example of the present disclosure, a detailed description of well-known features or functions will be ruled out in order not to unnecessarily obscure the gist of the present disclosure. In the drawings, parts not related to the description are omitted, and like reference numerals refer to like elements throughout the specification.

In the present disclosure, it will be understood that if an element is referred to as being "connected to", "coupled to", or "combined with" another element, the element may be directly connected or coupled to or combined with the another element or intervening elements may be present therebetween. It will be further understood that the terms "comprise", "include" or "have" when used in the present disclosure specify the presence of stated elements but do not preclude the presence or addition of one or more other elements.

In the present disclosure, terms such as first and second are used only for the purpose of distinguishing one element from other elements, and do not limit the order or importance of the elements unless specifically mentioned. Accordingly, within the scope of the present disclosure, a first component in one example may be referred to as a second component in another example, and similarly, the second component in one example may be referred to as a first component in another example.

In the present disclosure, distinct elements are only for clearly describing their features, and do not mean that the elements are separated necessarily. That is, a plurality of elements may be integrated to form a single hardware or software unit, or a single element may be distributed to form a plurality of hardware or software units. Accordingly, such integrated or distributed examples are included in the scope of the present disclosure, even if not otherwise noted.

In the present disclosure, elements described in the various examples are not necessarily essential elements, and some elements may be optional. Accordingly, examples including a subset of the elements described in one example are also included in the scope of the present disclosure. Furthermore, examples including other elements in addition or alternative to the elements described in the various examples are also within the scope of this disclosure.

In the present disclosure, expressions of positional relationships used in the specification, such as top, bottom, left, or right, are described for convenience of description, and if the drawings shown in the specification are viewed in reverse, the positional relationships described in the specification may also be interpreted in the opposite way.

In the present disclosure, each of the phrases "A or B," "at least one of A and B," "at least one of A or B," "A, B or C," "at least one of A, B and C," and "at least one of A, B, or C" may include any one of items listed along with a relevant phrase, or any combination thereof.

Examples of the present disclosure will be described below in detail with reference to FIGS. 1 to 7.

FIG. 1 shows an example of a vehicle control method according to an example disclosed herein. For convenience, FIG. 1 is described by way of an example in which the steps are performed by a vehicle control device 2000 (e.g., control circuitry). One, some, or all steps of the example method of FIG. 1, or portions thereof, may be performed by one or more other circuits. One or some, steps of the example method of FIG. 1 may be omitted, performed in other orders, and/or otherwise modified, and/or one or more additional steps may be added.

Referring to FIG. 1, a point generator may generate a specified point as a first preliminary sample point within a first sampling area set based on state information of a moving object (e.g., vehicle, a pedestrian, a bicycle, a dog, etc.) (S110).

For reference, the state information of the moving object may include variable state information of the moving object and fixed state information of the moving object. In this case, the variable state information of the moving object may include information that may vary depending on the movement of the moving object, and may include, for example, at least part of current location information of the moving object and the current heading information (e.g., direction and orientation of the moving object relative to its surroundings, such as heading angle, yaw rate, velocity vector, trajectory prediction, lane position/orientation, lateral displacement, curvature of path, angular velocity, drift angle, etc.) of the moving object. Further, the fixed state information of the moving object may include information that is not affected by the movement of the moving object, such as at least a portion of the length information of the moving object (wheel base length or overall length, wheel base width or overall width, and/or the like) and the maximum steering angle information of the moving object.

For example, the point generator may generate the first preliminary sample point within the first sampling area based on Gaussian random sampling, but the method according to an example disclosed herein is not limited thereto. Gaussian random sampling refers to the process of generating random samples from a Gaussian distribution, which is a normal distribution. The Gaussian distribution is a continuous probability distribution characterized by its bell-shaped curve, where most of the values cluster around the mean (average) value, and the likelihood of values decreases symmetrically as it moves away from the mean.

The first sampling area will be described in more detail with reference to FIGS. 2 and 3 below.

Figure 2:
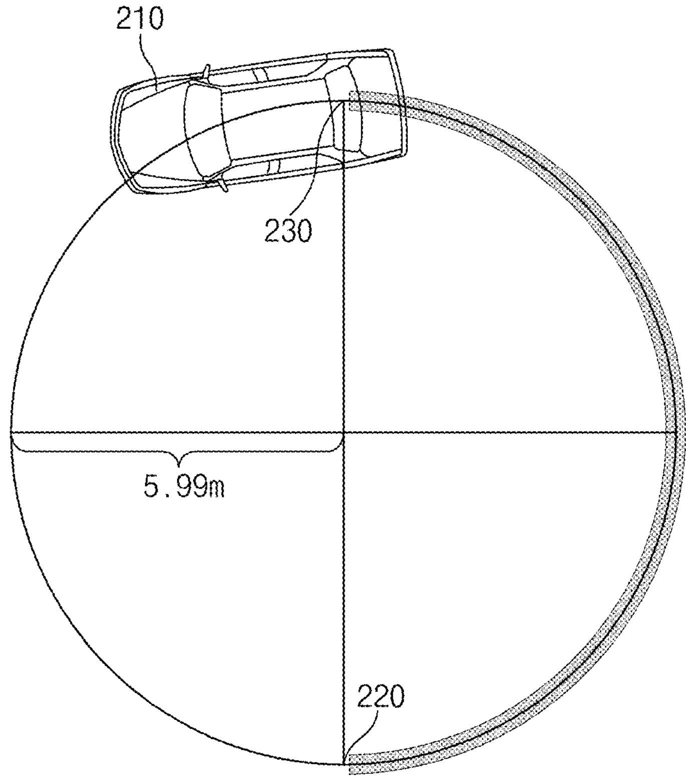
FIG. 2 shows an example of a method for generating a preliminary sample point according to an example disclosed herein.

FIG. 2 shows an example of how the state information of a moving object 210 is referenced in setting the first sampling area.

First, the wheel base length (l) of the moving object 210 may be 3 m, the maximum steering angle (δ) of the moving object may be 26.6°. If the moving object turns at the maximum steering angle, the minimum turning radius (R) of the moving object may be 5.99 m according to the Equation 1 below.

$$\delta = \tan^{-1}(l/R) \quad \text{[Equation 1]}$$

Therefore, if the moving object 210 turns at the maximum steering angle and along the minimum turning radius, a minimum travel distance of 5.99*π m (i.e. 18.818 m) may be used for the heading information at an arrival position 230 to change by −180° compared to the heading information at a start position 220 (e.g.)+90°, as shown in FIG. 2. Similarly, to adjust the heading information by 1° may require at least a travel distance of 5.99*π/180 m (i.e. 0.1045 m). Likewise, to adjust the heading information at the arrival position by 10° compared to the heading information at the start position, a travel distance of at least 5.99*π*10/180 m (1.045 m) may be used.

That is, the heading information may be changed by up to 9.5652° per 1 m of travel distance, and heading information may be changed by up to 29° per 3 m of travel distance.

Accordingly, the first sampling area may be set based on the state information of the moving object 210 as described above.

Figure 3:
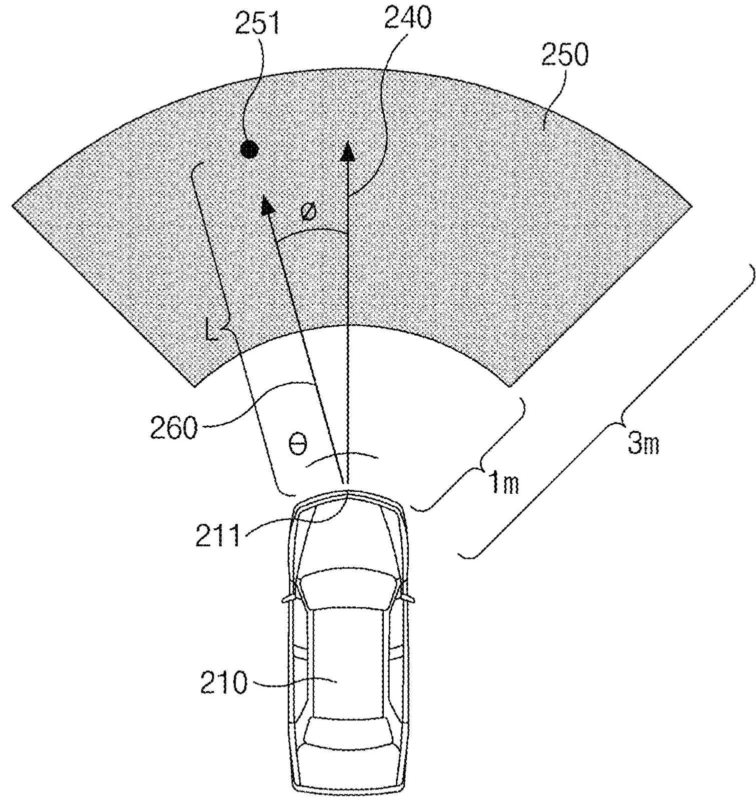
FIG. 3, FIG. 4, and FIG. 5 show examples of a method for generating a fixed sample point according to an example disclosed herein.

For example, as shown in FIG. 3, the point generator may set a sampling area 250 satisfying a separation range (e.g., 1 m to 3 m) condition within an angle range (θ) of −29° to +29° with respect to a front direction 240 of the moving object and a specified point 211 (e.g., the center point, the left of the center point, or the right of the center point of the front bumper) of the front (e.g., front bumper) of the moving object 210 (211), and generate a specified point 251 within the sampling area 250 as a preliminary sample point.

For reference, the specific separation range and specific angle range described above are only examples to aid understanding, and the method disclosed herein is not limited to the above examples.

For reference, heading information 240 (e.g., heading angle, yaw rate, velocity vector, trajectory prediction, lane position/orientation, lateral displacement, curvature of path, angular velocity, drift angle, etc.) of the moving object 210 may be a value that is updated according to the movement of the moving object 210. For example, as shown in FIG. 3, if the moving object 210 moves to a preliminary sample point 251 with a heading change amount of Ø while the current heading information 240 of the moving object 210 is +50°, the heading information of the moving object 210 may be updated to (50−Ø)°.

Then, if the first preliminary sample point is generated in S110, the point determiner may determine a first fixed sample point satisfying a sample point fixing condition by referring to information corresponding to a goal point (e.g., the position or coordinates of the goal, target, arrival, or destination point, or/and the like, conditions of the goal point, etc.) and information corresponding to the first preliminary sample point (e.g., the position, coordinates, or conditions of the first preliminary sample point, the heading information 260, 270 of the moving object to be updated if the position of the first preliminary sample point or a goal point 280 is reached, and/or the like) (S120).

For example, the sample point fixing condition may include at least a portion of (if) a first condition that a distance between the first preliminary sample point and the goal point is shorter than the distance between the current position of the moving object and the goal point, (ii) a second condition that an angle (|Ø−φ) used to look at the goal point from the first preliminary sample point is smaller than a threshold (φ|+A) corresponding to an angle (|φ|) used to look at the goal point from the current position (iii) a third condition that the distance (L) between the preliminary sample point and the moving object is greater than the minimum separation distance from the moving object.

The second condition will be described with additional reference to FIG. 4.

Figure 4:
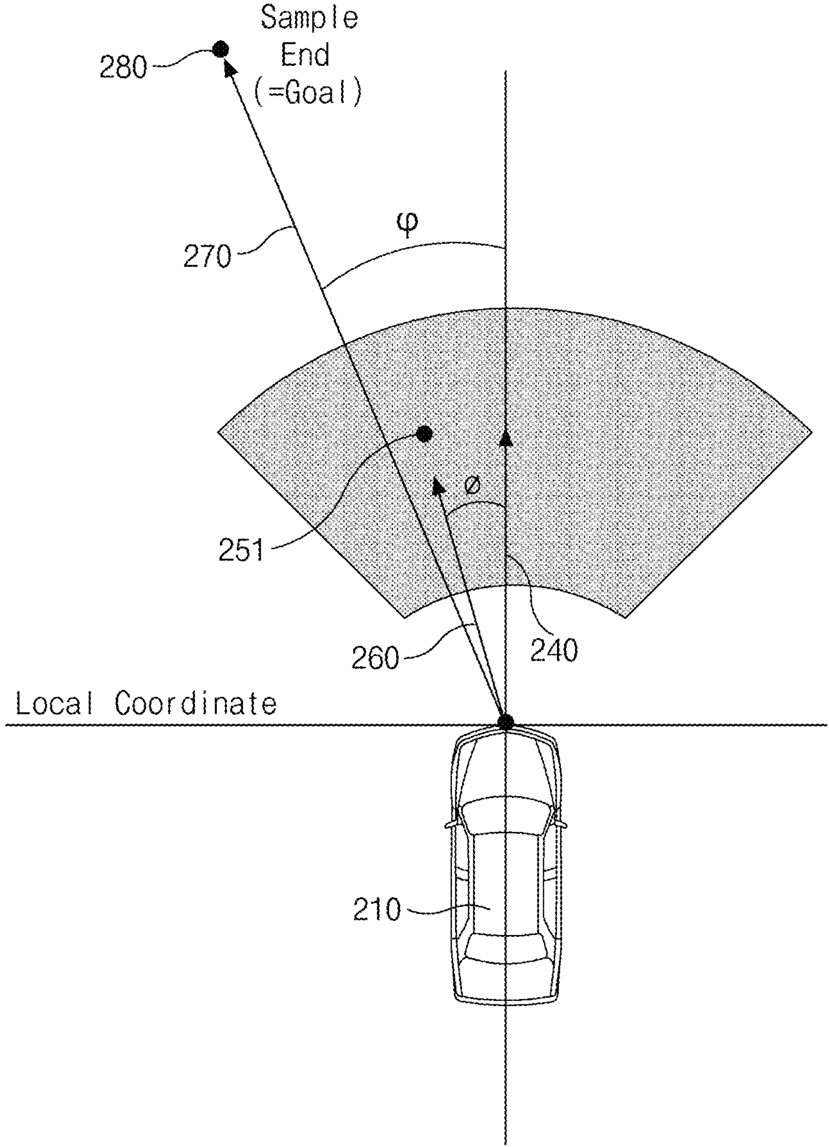

Referring to FIG. 4, the angle used to look at a goal point 280 from the first preliminary sample point 251 may be ||−φ|, and the angle used to look at the goal point 280 from the current position may be |φ|.

For example, it may be seen from FIG. 4 that, because an angle (i.e. |Ø−φ|=10°) used to look at the goal point 280 from the first preliminary sample point 251 is less than the threshold (i.e. |φ|+A=35°) corresponding to the angle used to look at the goal point from the current position (i.e. |φ|=20°) if Ø is −10° and φ is −20° while A is set to 15, the second condition is satisfied.

As another example, For example, it may be seen that, because an angle (i.e. |Ø−φ|=30° used to look at the goal point 280 from the first preliminary sample point 251 is less than the threshold (i.e. |φ|+A=35°) corresponding to the angle used to look at the goal point 280 from the current position (i.e. |φ|=20°) if Ø is +10° and φ is −20° while A is set to 15, the second condition is satisfied.

Meanwhile, the third condition will be described with additional reference to FIG. 5.

Figure 5:
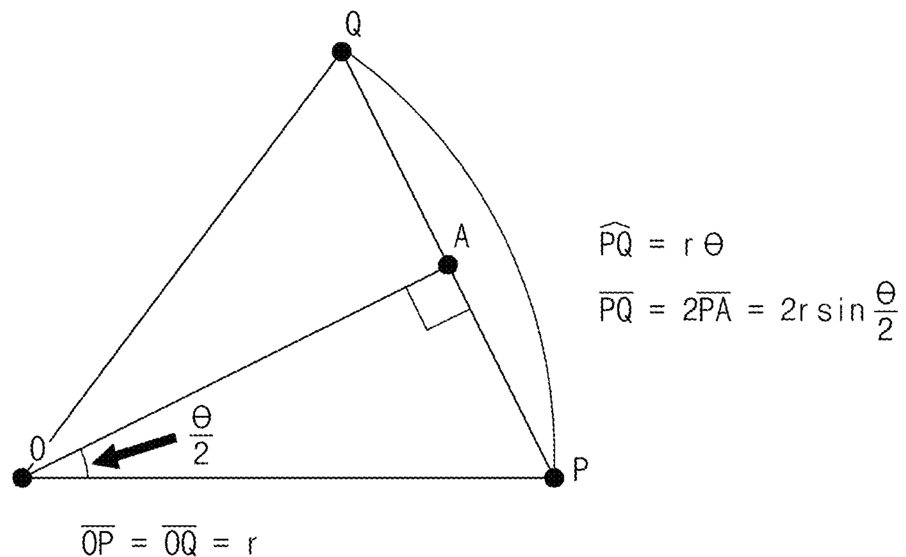

Referring to FIG. 5, it may be seen that the shortest distance to reach point Q from point P is 2*r*sin(θ/2). That is, if 5.99 m is substituted as the minimum turning radius of the moving object, the minimum separation distance between the preliminary sample point and the moving object may be 2*5.99*sin(θ/2). Therefore, it may be seen that the distance (L) between the sample point and the moving object in FIG. 3 needs to be greater than the minimum separation distance from the moving object for the moving object to reach the sample point.

In this case, the point determiner may determine a first optimal sample point by additionally or alternatively considering whether the moving object collides with an obstacle if moving to the preliminary sample point.

For example, in S120, the point determiner may determine a first fixed sample point that additionally or alternatively satisfies a first free space area condition calculated using state information of the moving object.

Meanwhile, in S120, a case may occur where the first preliminary sample point generated by the point generator does not satisfy at least one of the sample point fixing condition and the first free space area condition. In this case, the point generator may generate a new first preliminary sample point, and the point determiner may determine whether the new first preliminary sample point satisfies the sample point fixing condition and the first free space area condition.

For example, if a collision situation occurs when the moving object 210 moves to the preliminary sample point 251 shown in FIG. 3 (i.e., if the free space area condition is not satisfied because the preliminary sample point is located outside the free space area or on its border), the point determiner may not determine the preliminary sample point as a fixed sample point even if the preliminary sample point satisfies the sample point fixing condition.

That is, after the point generator regenerates a new preliminary sample point, the point determiner may determine a fixed sample point based on the new preliminary sample point.

For example, if it is determined that the first preliminary sample point does not satisfy at least one of the sample point fixing condition and the first free space area condition, the point generator may regenerate (re-sample) a first re-specified point in the first sampling area as the first preliminary sample point.

Furthermore, the point determiner may re-determine a first fixed sample point that satisfies the sample point fixing condition and the first free space area condition by referring to the information corresponding to the goal point and the information corresponding to the first preliminary sample point.

If it is determined that the first preliminary sample point, which is the newly sampled first re-specified point, does not satisfy at least one of the sample point fixing condition and the first free space area condition, sampling may be repeatedly performed until a first preliminary sample point that satisfies the sample point fixing condition and the first free space area condition is generated.

For reference, a method for detecting a free space area in which a moving object is able to travel is easily understood by those skilled in the art, so that description thereof is omitted in the present disclosure.

If the first fixed sample point is determined in step S120, the point generator may generate, as a second preliminary sample point, a specified point in a second sampling area, which is set based on the state information updated based on the first fixed sample point (S130). For reference, overlapping descriptions of content that is the same/similar to the content described with reference to S110 and S120 will be omitted.

If the second preliminary sample point is generated in S130, the point determiner may determine a second fixed sample point that satisfies the sample point fixing condition by referring to the information corresponding to the goal point and the information corresponding to the second preliminary sample point (S140).

For example, in S140, the point determiner may determine a second fixed sample point that additionally or alternatively satisfies a second free space area condition calculated using the state information of the moving object.

Meanwhile, in S140, a case may occur where the preliminary sample point (e.g., second preliminary sample point) generated by the point generator does not satisfy at least one of the sample point fixing condition and the free space area condition. In this case, a new sample point (e.g., a new second preliminary sample point) may be generated, and it may be determined whether the sample point satisfies the sample point fixing condition and the second free space area condition.

For example, if it is determined that the second preliminary sample point does not satisfy at least one of the sample point fixing condition and the second free space area condition, the point generator may re-generate a second re-specified point within the second sampling area as the second preliminary sample point.

If it is determined that the second preliminary sample point, which is the newly sampled second re-specified point, does not satisfy at least one of the sample point fixing condition and the second free space area condition, sampling may be repeatedly performed until a second preliminary sample point, which satisfies the sample point fixing condition and the second free space area condition, is generated.

Furthermore, the point determiner may re-determine a second fixed sample point that satisfies the sample point fixing condition and the second free space area condition by referring to the information corresponding to the goal point and the information corresponding to the second preliminary sample point.

Meanwhile, a case may occur in which the entire second sampling area does not satisfy at least one of the sample point fixing condition and the second free space area condition. If it is determined that the entire second sampling area does not satisfy at least one of the sample point fixing condition and the second free space area condition, the point generator may generate a new first preliminary sample point, and the point determiner may determine a new first fixed sample point based on the new first preliminary sample point. Furthermore, the point generator may generate a new second preliminary sample point based on the new first fixed sample point, and the point determiner may determine whether the new second preliminary sample point satisfies the sample point fixing condition and the second free space area condition.

In addition or alternative, the process of determining the fixed sample point as described above may be repeatedly performed up to an area adjacent to the goal point. A case where the fixed sample point is finally determined will be described below. For reference, the second preliminary sample point is described as an example of the finally generated preliminary sample point, but the example disclosed herein is not limited thereto.

For example, the sampling process may be terminated if the preliminary sample point is located within a predetermined area set based on the position of the goal point.

For example, in S140, if the second preliminary sample point is located within a predetermined area set based on the position of the goal point, the point determiner may determine a second fixed sample point satisfying a sample point fixing condition based on a result of comparing a first heading difference value and a second heading difference value, the first heading difference value being determined between heading information (e.g., a direction in which the moving object looks at if the moving object is located at the first preliminary sample point) at a first preliminary sample point (e.g., a sample point generated in a previous phase than the last generated sample point) and heading information corresponding to the goal point (e.g., goal heading information that the moving object is to look at if the moving object arrives at the goal point or its adjacent area), and the second heading difference value being determined between heading information (e.g., a direction in which the moving object looks at if the moving object is located at the second preliminary sample point) at the second preliminary sample point (e.g., the last generated sample point) and heading information corresponding to the goal point.

For reference, the predetermined area set based on the position of the goal point may be an area within a predetermined radius from the position of the goal point, but is not limited thereto.

For example, if the second preliminary sample point is located within a predetermined area set based on the position of the goal point, a condition that the second heading difference value is smaller than a value obtained by adding a predetermined value to the first heading difference value may be an additional sample point fixing condition. For example, if the first heading difference value is 15°, the predetermined value is 10, and the second heading difference value is 20°, the additional sample point fixing condition is satisfied, so that the point determiner may determine the corresponding second preliminary sample point as the second fixed sample point.

On the other hand, if the first heading difference value is 15°, the predetermined value is 10, and the second heading difference value is 30°, the additional sample point fixing condition is not satisfied, so that the point determiner may not determine the corresponding second preliminary sample point as the second fixed sample point.

If the additional sample point fixing condition is not satisfied, that is, if the second heading difference value is outside a threshold range set based on the first heading difference value, the point generator may regenerate a second re-specified point within a second sampling area, as a second preliminary sample point.

In addition or alternative, the point determiner may determine a second fixed sample point that satisfies the sample point fixing condition based on a result of re-comparing the first heading difference value and the second heading difference value.

Meanwhile, a case may occur in which the entire second sampling area does not satisfy at least one of the sample point fixing condition and the second free space area condition. If the above-described case is determined, the point generator may generate a new first preliminary sample point, the point determiner may determine a new first fixed sample point based on the new first preliminary sample point. Thereafter the point generator may generate a new second preliminary sample point based on the new first fixed sample point and the point determiner may perform a process of determining whether the new second preliminary sample point satisfies the sample point fixing condition and the second free space area condition.

If the second fixed sample point is determined in S140, the path generator may generate a travel path based on a fixed sample point group including the first fixed sample point and the second fixed sample point (S150).

That is, if a plurality of fixed sample points are generated and selected according to the process described above, the path generator may generate a travel path based on the plurality of fixed sample points. For example, the path generator may generate a B-Spline based on the plurality of fixed sample points and output a travel path based on the B-Spline.

If the travel path is generated in S150, a vehicle controller may control a vehicle based on the result of generating the travel path (S160) for autonomous driving of the vehicle.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver when the used conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

For example, the vehicle controller may control the vehicle according to the generated travel path. As another example, if an additional travel path (e.g., detour route, lane change, overtaking path, intersection turn options, roundabout exit selection, off-ram exist, U-turn path, emergency stop path, shortcut path, parking maneuver path, etc.) is additionally or alternatively generated in addition or alternative to the travel path, the vehicle controller may control the vehicle according to an optimal travel path determined among the travel path and the additional travel path. The process by which the optimal travel path is determined will be described below.

For example, if the process of generating a travel path according to S110 to S150 is repeatedly performed at least twice to generate a plurality of travel paths, an optimal travel path determiner may determine an optimal travel path among the plurality of travel paths.

For example, if at least one additional travel path is generated, the optimal travel path determiner may determine an optimal travel path among the travel path and the additional travel path by referring to the goal point, some of points included in the fixed sample point group corresponding to the travel path and some of points included in an additional fixed sample point group corresponding to the additional travel path.

For example, if a first additional travel path is generated, the optimal travel path determiner may determine an optimal travel path by comparing (i) a first circle generated based on the goal point, the n-th fixed sample point, which is the last determined point among the points included in the fixed sample point group, and the (n−1)-th fixed sample point, which is the point selected immediately before the n-th fixed sample point and (ii) a second circle generated based on the goal point, the m-th fixed sample point, which is the last selected point of points included in the additional fixed sample point group of the first additional travel path, and the (m−1)-th fixed sample point, which is the point selected immediately before the m-th fixed sample point of the first additional travel path.

For example, the optimal travel path determiner may compare the radius of the first circle and the radius of the second circle and determine a specified travel path corresponding to a specified circle having a larger radius as the optimal travel path. Accordingly, it is possible to determine a travel path that most smoothly approaches the end point.

Although the case where one additional travel path is additionally or alternatively generated has been described above, the method is not limited thereto, and the method according to an example disclosed herein may be applied even a case where two or more additional travel paths are generated.

Figure 6:
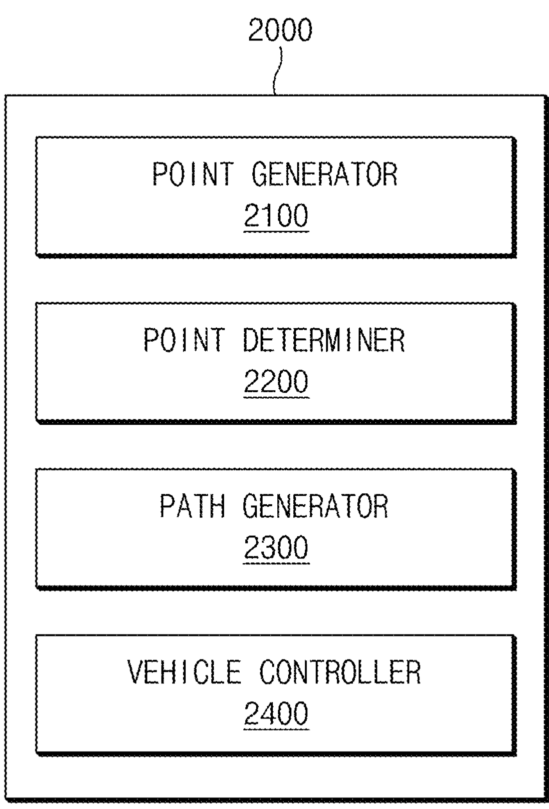
FIG. 6 shows an example of a vehicle control device according to an example disclosed herein.

FIG. 6 is a block diagram schematically showing a vehicle control device 2000 according to an example disclosed herein.

Referring to FIG. 6, the vehicle control device 2000 (e.g., control circuitry) according to an example herein may include a point generator 2100, a point determiner 2200, a path generator 2300, and a vehicle controller 2400. Additionally or alternatively, the vehicle control device 2000 according to an example disclosed herein may additionally or alternatively include an optimal travel path determiner (not shown).

First, the point generator 2100 may generate a specified point in a first sampling area set based on the state information of a moving object as a first preliminary sample point, and generate a specified point in a second sampling area set based on the state information updated according to the first fixed sample point corresponding to the first preliminary sample point, as a second preliminary sample point.

In addition or alternative, the point determiner 2200 may determine the first fixed sample point that satisfies the sample point fixing condition by referring to information corresponding to the goal point and information corresponding to the first preliminary sample point, and determine a second fixed sample point that satisfies the sample point fixing condition by referring to the information corresponding to the goal point and the information corresponding to the second preliminary sample point.

In addition or alternative, the path generator 2300 may generate a travel path based on a fixed sample point group including the first fixed sample point and the second fixed sample point.

In addition or alternative, the vehicle controller 2400 may control the vehicle based on the result of generating the travel path.

Furthermore, the optimal travel path determiner (not shown) may determine an optimal travel path among the travel path and the additional travel path by referring to the goal point, some of points included in the fixed sample point group corresponding to the travel path, and some of points included in the additional fixed sample point group corresponding to the additional travel path.

According to the vehicle control method disclosed herein, it is possible to generate a travel path using a sampling method based on information on an area in which the vehicle is able to travel, without using dynamic memory such as a tree and/or graph, and generate a smooth travel path.

Figure 7:
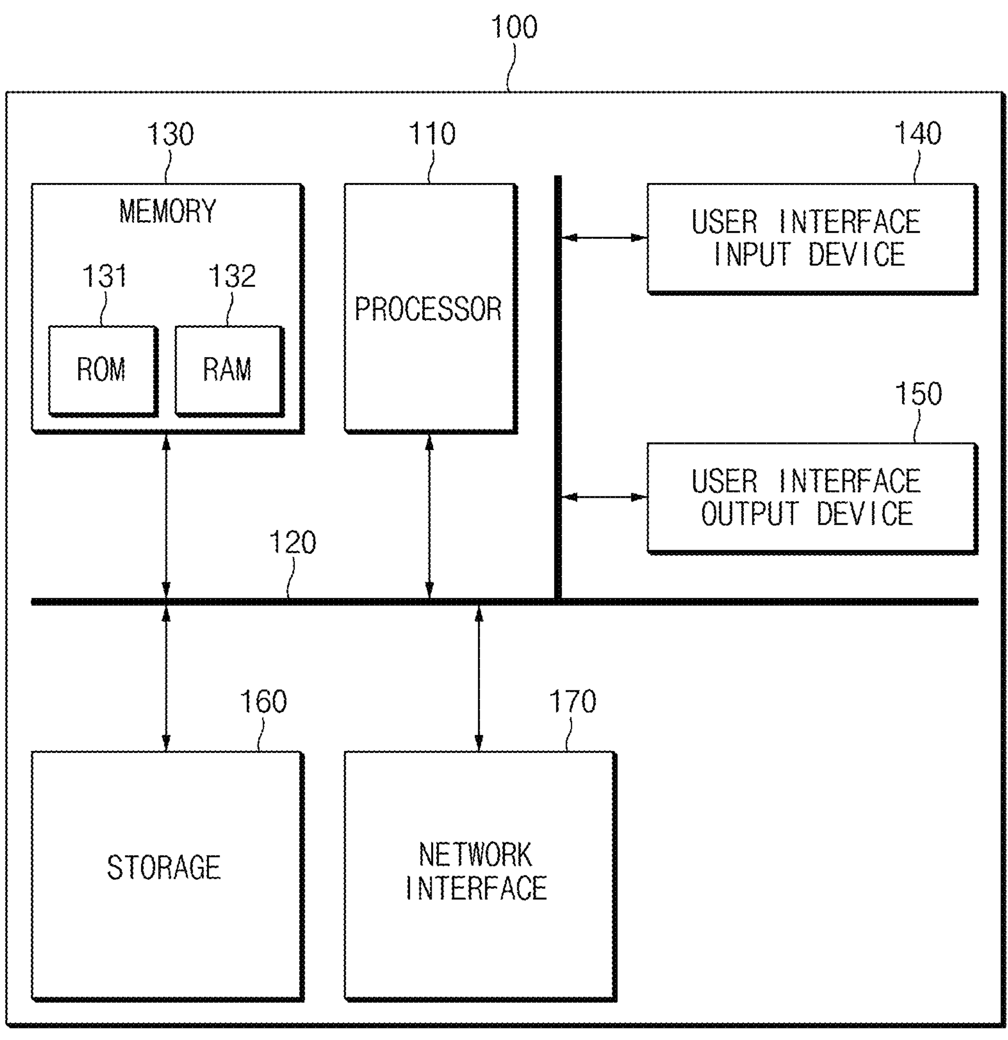
FIG. 7 shows an example of a computing system for performing a vehicle control method according to an example of the present disclosure.

FIG. 7 shows an example of a computing system for executing a vehicle control method according to an example of the present disclosure.

Referring to FIG. 7, a vehicle control method according to an example of the present disclosure as described above may be also implemented through a computing system. A computing system 100 may include at least one processor 110, a memory 130, a user interface input device 140, a user interface output device 150, storage 160, and a network interface 170, which are connected with each other via a system bus 120.

The processor 110 may be a central processing unit (CPU) or a semiconductor device that processes instructions stored in the memory 130 and/or the storage 160. The memory 130 and the storage 160 may include various types of volatile or non-volatile storage media. For example, the memory 130 may include a ROM (Read Only Memory) 131 and a RAM (Random Access Memory) 132.

Thus, the operations of the method or the algorithm described in connection with the examples disclosed herein may be embodied directly in hardware or a software module executed by the processor 110, or in a combination thereof. The software module may reside on a storage medium (that is, the memory 130 and/or the storage 160) such as a RAM, a flash memory, a ROM, an EPROM, an EEPROM, a register, a hard disk, a removable disk, and a CD-ROM. The exemplary storage medium may be coupled to the processor 110, and the processor 110 may read information out of the storage medium and may record information in the storage medium. Alternatively, the storage medium may be integrated with the processor 110. The processor 110 and the storage medium may reside in an application specific integrated circuit (ASIC). The ASIC may reside within a user terminal. In another case, the processor 110 and the storage medium may reside in the user terminal as separate components.

The present disclosure has been made to solve the above-mentioned problems occurring in the prior art while advantages achieved by the prior art are maintained intact.

An example of the present disclosure provides a vehicle control method and device for generating a travel path without precise map information.

An example of the present disclosure provides a vehicle control method and device for generating a travel path based on points sampled in consideration of kinematics.

An example of the present disclosure provides a vehicle control method and device for generating a smooth travel path without a collision with objects existing around a moving object.

The technical problems of the present disclosure are not limited to the aforementioned problems, and any other technical problems not mentioned herein will be clearly understood from the following description by those skilled in the art.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a method includes generating, by a point generator, a specified point in a first sampling area set based on state information of a moving object as a first preliminary sample point, determining, by a point determiner, a first fixed sample point that satisfies a sample point fixing condition by referring to information corresponding to a goal point and information corresponding to the first preliminary sample point, generating, by the point generator, a specified point in a second sampling area set based on state information updated based on the first fixed sample point as a second preliminary sample point, determining, by the point determiner, a second fixed sample point that satisfies the sample point fixing condition by referring to the information corresponding to the goal point and information corresponding to the second preliminary sample point, generating, by a path generator, a travel path based on a fixed sample point group including the first fixed sample point and the second fixed sample point, and controlling, by a vehicle controller, a vehicle based on a result of generating the travel path.

According to an example, the method may further include, after the generating of the travel path, determining, by an optimal travel path determiner, an optimal travel path among the travel path and an additional travel path by referring to the goal point, some of points included in the fixed sample point group corresponding to the travel path, and some of points included in an additional fixed sample point group corresponding to the additional travel path if at least one additional travel path is generated by repeatedly performing steps of claim 1 at least once, and the controlling of the vehicle may include controlling, by the vehicle controller, the vehicle based on the optimal travel path.

According to an example, the determining of the optimal travel path may include determining, by the optimal travel path determiner, the optimal travel path by comparing (i) a first circle generated based on the goal point, an n-th fixed sample point, which is a last determined point among points included in the fixed sample point group, and an (n−1)-th fixed sample point, which is a point determined immediately before the n-th fixed sample point among points included in the fixed sample point group and (ii) a second circle generated based on the goal point, an m-th fixed sample point, which is a last determined point of points included in the additional fixed sample point group, and an (m−1)-th fixed sample point, which is a point determined immediately before the m-th fixed sample point among points included in the additional fixed sample point group.

According to an example, the state information of the moving object may include variable state information and fixed state information, the variable state information may include position information of the moving object and heading information of the moving object, and the fixed state information may include length information of the moving object and a maximum steering angle of the moving object.

According to an example, the determining of the first fixed sample point may include determining, by the point determiner, the first fixed sample point that additionally or alternatively satisfies a first free space area condition calculated using the state information of the moving object, and the determining of the second fixed sample point may include determining, by the point determiner, the second fixed sample point that additionally or alternatively satisfies a second free space area condition calculated using the state information of the moving object.

According to an example, the determining of the second fixed sample point may include regenerating, by the point generator, a second re-specified point in the second sampling area as the second preliminary sample point, if it is determined that the second preliminary sample point does not satisfy at least one of the sample point fixing condition and the second free space area condition, and redetermining, by the point determiner, the second fixed sample point that satisfies the sample point fixing condition and the second free space area condition by referring to the information corresponding to the goal point and the information corresponding to the second preliminary sample point.

According to an example, the determining of the second fixed sample point may include determining, by the point determiner, the second fixed sample point that satisfies the sample point confirmation condition based on a result of comparing a first heading difference value between heading information at the first preliminary sample point and heading information corresponding to the goal point, and a second heading difference value between heading information at the second preliminary sample point and the heading information corresponding to the goal point if the second preliminary sample point is located within a predetermined area that is set based on the position of the goal point.

According to an example, the determining of the second fixed sample point may include regenerating, by the point generator, a second re-specified point in the second sampling area as the second preliminary sample point, if the second heading difference value is outside a threshold range set based on the first heading difference value, and determining, by the point determiner, the second fixed sample point that satisfies the sample point fixing condition based on a result of recomparing the first heading difference value and the second heading difference value.

According to an example of the present disclosure, a device includes a point generator that generates a specified point in a first sampling area set based on state information of a moving object as a first preliminary sample point and generates a specified point in a second sampling area set based on state information updated based on the first fixed sample point as a second preliminary sample point, a point determiner that determines a first fixed sample point that satisfies a sample point fixing condition by referring to information corresponding to a goal point and information corresponding to the first preliminary sample point, and determines a second fixed sample point that satisfies the sample point fixing condition by referring to the information corresponding to the goal point and information corresponding to the second preliminary sample point, a path generator that generates a travel path based on a fixed sample point group including the first fixed sample point and the second fixed sample point, and a vehicle controller that controls a vehicle based on a result of generating the travel path.

According to an example, the device may further include an optimal travel path determiner configured to determine an optimal travel path among the travel path and an additional travel path by referring to the goal point, some of points included in the fixed sample point group corresponding to the travel path, and some of points included in an additional fixed sample point group corresponding to the additional travel path if at least one additional travel path is generated by the path generator of claim 9, and the vehicle controller may control the vehicle based on the optimal travel path.

According to an example, the optimal travel path determiner may determine the optimal travel path by comparing (i) a first circle generated based on the goal point, an n-th fixed sample point, which is a last determined point among points included in the fixed sample point group, and an (n−1)-th fixed sample point, which is a point determined immediately before the n-th fixed sample point among points included in the fixed sample point group and (ii) a second circle generated based on the goal point, an m-th fixed sample point, which is a last determined point of points included in the additional fixed sample point group, and an (m−1)-th fixed sample point, which is a point determined immediately before the m-th fixed sample point among points included in the additional fixed sample point group.

According to an example, the state information of the moving object may include variable state information and fixed state information, the variable state information may include position information of the moving object and heading information of the moving object, and the fixed state information may include length information of the moving object and a maximum steering angle of the moving object.

According to an example, the point determiner may determine the first fixed sample point that additionally or alternatively satisfies a first free space area condition calculated using the state information of the moving object, and determine the second fixed sample point that additionally or alternatively satisfies a second free space area condition calculated using the state information of the moving object.

According to an example, the point generator may regenerate a second re-specified point in the second sampling area as the second preliminary sample point, if it is determined that the second preliminary sample point does not satisfy at least one of the sample point fixing condition and the second free space area condition, and the point determiner may redetermine the second fixed sample point that satisfies the sample point fixing condition and the second free space area condition by referring to the information corresponding to the goal point and the information corresponding to the second preliminary sample point.

According to an example, the point determiner may determine the second fixed sample point that satisfies the sample point confirmation condition based on a result of comparing a first heading difference value between heading information at the first preliminary sample point and heading information corresponding to the goal point, and a second heading difference value between heading information at the second preliminary sample point and the heading information corresponding to the goal point if the second preliminary sample point is located within a predetermined area that is set based on the position of the goal point.

According to an example, if the second heading difference value is outside a threshold range set based on the first heading difference value, (i) the point generator may perform a process of regenerating a second re-specified point in the second sampling area as the second preliminary sample point, and (ii) the point determiner may perform a process of determining the second fixed sample point that satisfies the sample point fixing condition based on a result of recomparing the first heading difference value and the second heading difference value.

The above description is merely illustrative of the technical idea of the present disclosure, and various modifications and variations may be made without departing from the essential characteristics of the present disclosure by those skilled in the art to which the present disclosure pertains. Therefore, the examples of the present disclosure are provided to explain the spirit and scope of the present disclosure, but not to limit them, so that the spirit and scope of the present disclosure is not limited by the examples. The scope of protection of the present disclosure should be interpreted by the following claims, and all technical ideas within the scope equivalent thereto should be construed as being included in the scope of the present disclosure.

According to the present disclosure, it is possible to provide a vehicle control method and device for generating a travel path without precise map information.

According to the present disclosure, it is possible to provide a vehicle control method and device for generating a travel path based on points sampled in consideration of kinematics.

According to the present disclosure, it is possible to provide a vehicle control method and device for generating a smooth travel path without a collision with objects existing around a moving object.

In addition or alternative, various effects may be provided that are directly or indirectly understood through the disclosure.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method performed by one or more processors for autonomous driving of a vehicle, the method comprising:

generating, based on state information of a moving object, a point in a first sampling area as a first preliminary sample point;

determining, based on a sample point fixing condition associated with a goal point and information associated with the first preliminary sample point, a first fixed sample point;

generating, based on updated state information, a point in a second sampling area as a second preliminary sample point, wherein the updated state information is state information of the moving object updated based on the first fixed sample point;

determining, based on the sample point fixing condition and information associated with the second preliminary sample point, a second fixed sample point;

generating, based on a fixed sample point group comprising the first fixed sample point and the second fixed sample point, a travel path;

generating, based on the travel path, a control signal; and controlling, based on the control signal, the vehicle for autonomous driving.

2. The method of claim 1, further comprising:

after the generating of the travel path, generating at least one additional travel path;

based on a plurality of points included in the fixed sample point group and a plurality of points included in an additional fixed sample point group of the at least one additional travel path, determining an optimal travel path; and controlling, based on the optimal travel path, the vehicle for autonomous driving.

3. The method of claim 2, wherein the determining the optimal travel path comprises determining the optimal travel path by comparing first information and second information, wherein the first information comprises a first circle generated based on the goal point, an n-th fixed sample point, which is a last determined point among points included in the fixed sample point group, and an (n−1)-th fixed sample point, which is a point determined immediately before the n-th fixed sample point among points included in the fixed sample point group, and wherein the second information comprises a second circle generated based on the goal point, an m-th fixed sample point, which is a last determined point of points included in the additional fixed sample point group, and an (m−1)-th fixed sample point, which is a point determined immediately before the m-th fixed sample point among points included in the additional fixed sample point group.

4. The method of claim 1, wherein the state information of the moving object comprises:

variable state information, wherein the variable state information comprises position information of the moving object and heading information of the moving object; and fixed state information, wherein the fixed state information comprises length information of the moving object and a maximum steering angle of the moving object.

5. The method of claim 1, wherein the determining the first fixed sample point comprises determining, based on a first free space area condition calculated using the state information of the moving object, the first fixed sample point, wherein the first fixed sample point satisfies the first free space area condition, and wherein the determining the second fixed sample point comprises determining, based on a second free space area condition calculated using the state information of the moving object, the second fixed sample point, wherein the second fixed sample point satisfies the second free space area condition.

6. The method of claim 5, wherein the determining the second fixed sample point comprises:

generating, based on the second preliminary sample point not satisfying at least one of the sample point fixing condition and the second free space area condition, a second point in the second sampling area as the second preliminary sample point; and determining, based on the sample point fixing condition, the second free space area condition, and the information associated with the second preliminary sample point, the second fixed sample point, wherein the second fixed sample point satisfies the sample point fixing condition and the second free space area condition.

7. The method of claim 1, wherein the determining the second fixed sample point comprises determining, based on comparing a first heading difference value and a second heading difference value, the second fixed sample point, wherein:

the first heading difference value is a difference value between heading information at the first preliminary sample point and heading information at the goal point, the second heading difference value is a difference value between heading information at the second preliminary sample point and heading information at the goal point, and the second preliminary sample point is located within a predetermined area that is set based on the goal point.

8. The method of claim 7, wherein the determining the second fixed sample point comprises:

generating, based on the second heading difference value being outside a threshold range set based on the first heading difference value, a second point in the second sampling area as the second preliminary sample point; and determining, based on the sample point fixing condition and comparing the first heading difference value and the second heading difference value, the second fixed sample point, wherein the second fixed sample point satisfies the sample point fixing condition.

9. The method of claim 1, wherein the state information comprises at least one of:

current location of the moving object; or direction and orientation of the moving object.

10. The method of claim 1, wherein the information associated with the first preliminary sample point comprises a position of the first preliminary sample point.

11. A device for autonomous driving of a vehicle, the device comprising:

one or more processors; and memory storing instructions, when executed by the one or more processors cause the device to:

generate, based on state information of a moving object, a point in a first sampling area as a first preliminary sample point;

generate, based on updated state information, a point in a second sampling area as a second preliminary sample point, wherein the updated state information is state information of the moving object updated based on a first fixed sample point;

determine, based on a sample point fixing condition associated with a goal point and information associated with the first preliminary sample point, the first fixed sample point; determine, based on the sample point fixing condition and information associated with the second preliminary sample point, a second fixed sample point;

generate, based on a fixed sample point group comprising the first fixed sample point and the second fixed sample point, a travel path;

generate, based on the travel path, a control signal; and control, based on the control signal, the vehicle for autonomous driving.

12. The device of claim 11, wherein the one or more processors are further configured to:

generate at least one additional travel path;

based on a plurality of points included in the fixed sample point group and a plurality of points included in an additional fixed sample point group of the at least one additional travel path, determine an optimal travel path; and control, based on the optimal travel path, the vehicle for autonomous driving.

13. The device of claim 12, wherein the one or more processors are further configured to determine the optimal travel path by comparing first information and second information, wherein the first information comprises a first circle generated based on the goal point, an n-th fixed sample point, which is a last determined point among points included in the fixed sample point group, and an (n−1)-th fixed sample point, which is a point determined immediately before the n-th fixed sample point among points included in the fixed sample point group, and wherein the second information comprises a second circle generated based on the goal point, an m-th fixed sample point, which is a last determined point of points included in the additional fixed sample point group, and an (m−1)-th fixed sample point, which is a point determined immediately before the m-th fixed sample point among points included in the additional fixed sample point group.

14. The device of claim 11, wherein the state information of the moving object comprises:

variable state information, wherein the variable state information comprises position information of the moving object and heading information of the moving object; and fixed state information, wherein the fixed state information comprises length information of the moving object and a maximum steering angle of the moving object.

15. The device of claim 11, wherein the one or more processors are further configured to:

determine, based on a first free space area condition calculated using the state information of the moving object, the first fixed sample point, wherein the first fixed sample point satisfies the first free space area condition; and determine, based on a second free space area condition calculated using the state information of the moving object, the second fixed sample point, wherein the second fixed sample point satisfies the second free space area condition.

16. The device of claim 15, wherein the one or more processors are further configured to:

generate, based on the second preliminary sample point not satisfy at least one of the sample point fixing condition and the second free space area condition, a second point in the second sampling area as the second preliminary sample point; and determine, based on the sample point fixing condition, the second free space area condition, and the information associated with the second preliminary sample point, the second fixed sample point, wherein the second fixed sample point satisfies the sample point fixing condition and the second free space area condition.

17. The device of claim 11, wherein the one or more processors are further configured to determine, based on comparing a first heading difference value and a second heading difference value, the second fixed sample point, wherein:

the first heading difference value is a difference value between heading information at the first preliminary sample point and heading information at the goal point, the second heading difference value is a difference value between heading information at the second preliminary sample point and heading information at the goal point, and the second preliminary sample point is located within a predetermined area that is set based on the goal point.

18. The device of claim 17, wherein the one or more processors are further configured to generate, based on the second heading difference value being outside a threshold range set based on the first heading difference value, a second point in the second sampling area as the second preliminary sample point; and determine, based on the sample point fixing condition and comparing the first heading difference value and the second heading difference value, the second fixed sample point, wherein the second fixed sample point satisfies the sample point fixing condition.

19. The device of claim 11, wherein the state information comprises at least one of:

current location of the moving object; or direction and orientation of the moving object.

20. The device of claim 11, wherein the information associated with the first preliminary sample point comprises a position of the first preliminary sample point.

* * * * *